Feb. 12, 1935.  A. V. BEDFORD ET AL  1,990,517
AUTOMATIC CONTROLLING VALVE
Filed May 7, 1934
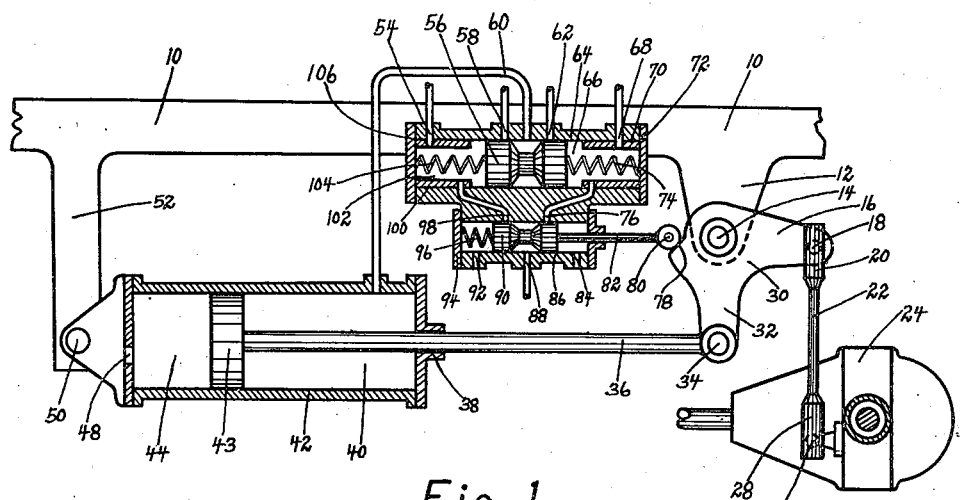
Fig. 1
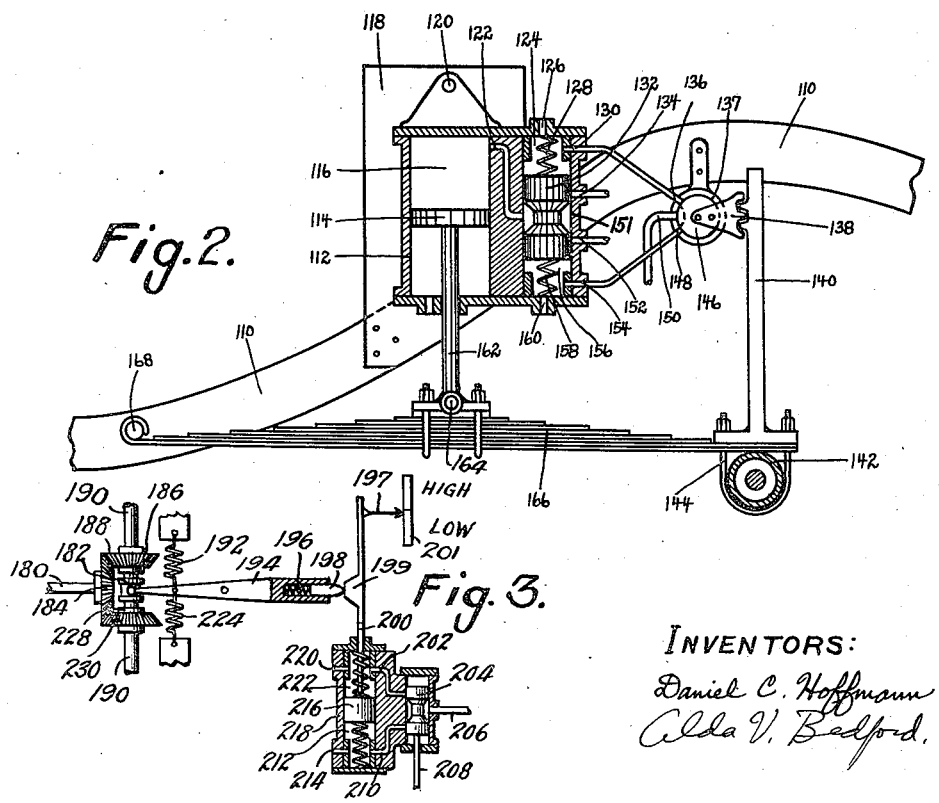
Fig. 2
Fig. 3
INVENTORS:
Daniel C. Hoffmann
Alda V. Bedford Patented Feb. 12, 1935

1,990,517

UNITED STATES PATENT OFFICE 1,990,517

AUTOMATIC CONTROLLING VALVE

Alda V. Bedford, Collingswood, N. J., and Daniel C. Hoffmann, Philadelphia, Pa.

Application May 7, 1934, Serial No. 724,358

15 Claims. (Cl. 267—15)

This invention relates to automatic controlling valves, and more particularly to an automatic controlling valve for a body-leveling power element for vehicles.

Primarily our invention is devised for use in connection with a vehicle spring suspension system, such, for instance, as that disclosed in our application for U. S. patent, Serial Number 709,144, filed January 31, 1934. In the application referred to, we have described and claimed an improved vehicle spring suspension in which a body-leveling power element is used to maintain a constant average height of the vehicle frame above the road surface by supporting the vehicle load independently of the suspension system.

In one embodiment of the present invention, the power element must exert an average force which is proportional to the load carried by the vehicle. In another embodiment, the vehicle leveling effect is obtained by a change in the average displacement of the power element. It would be possible to control the power element of either embodiment by manual means operated by the driver or passenger in the vehicle. Such manual control is not desirable, because it would require frequent attention and would be very inconvenient. To avoid these and other disadvantages, the power element must be under continuous automatic cntrol. Such automatic controlling means should respond to changes in the average height of the vehicle frame, as such changes are due to changes in the load carried by the vehicle. The controlling means should not respond to instantaneous changes in the height of the vehicle frame, as such changes are due to irregularities in the road surface. The primary object of this invention, therefore, is to provide automatic controlling means for a body-leveling power element adapted to maintain a constant height of the vehicle frame above the road surface by supporting the load carried by the vehicle.

Various purposes may be served on a vehicle by providing a fluid pressure source, the pressure of which is proportional to the load carried by the vehicle. For instance, in a fluid pressure brake system, it may be desirable to adjust the braking pressure according to the load, and on vehicles equipped with air springs, to regulate the pressure as the load changes. Also, in order to secure maximum riding comfort, it is desirable to vary the tire pressure and the stiffness of the seat cushions in accordance with the load. Another object of our invention, therefore, is to provide a fluid pressure source, the pressure of which is proportional to the load carried by the vehicle.

The subject matter of the present application involves the novel features of the automatic controlling valves, and while such valves are suitable for use on a vehicle, it will be apparent, as the description proceeds, that our invention is not necessarily limited to such specific application and use.

One embodiment of our invention broadly comprehends a controlling device actuated by the difference in fluid pressure in two compartments, the pressure in each compartment being the summation of a large number of small, successive, variable fluid pressure changes of like sense and a fluid pressure change at a constant or variable rate but of the opposite sense, for controlling or operating a fluid pressure responsive device or other apparatus.

To accomplish the aforementioned and other objects, the present invention consists of parts and combinations of parts which will be understood from the following description and from the accompanying drawing. In the drawing Fig. 1 is a fragmentary side view of a vehicle showing the preferred embodiment of our invention, partly in section, applied thereto, Fig. 2 is a similar view, showing another embodiment of our invention, and Fig. 3 is a fragmentary sectional view, showing a third embodiment of our invention.

Referring now to Fig. 1, the numerals 10 designate a portion of the vehicle frame approximately midway between the two rear wheels. A downwardly extending arm 12 of the frame 10 supports a bearing 14 upon which is pivotally mounted a bell crank 30. An arm 16 of the bell crank 30 carries at its extremity a ball 18 securely fastened thereto. A similar ball 26 is securely fastened to the differential housing 24 in a position approximately midway between the rear wheels. The ball 18 engages a socket 20 fastened to the upper end of the link 22. The ball 26 engages a socket 28 fastened to the lower end of the link 22. The balls 18 and 26 are free to rotate in their respective sockets 20 and 28. This form of link, well known in the art, is used to allow the differential housing 24 freedom of motion with respect to the bell crank 30 in all directions except vertically.

The differential housing 24 is illustrative of many forms of housings in common use and well known to those skilled in the art. The housing serves as a container and support for the driven end of the drive shaft and the differential mechanism. On each side of the housing, between it and the rear wheels, are extending tubular members rigidly fastened to the housing and serving as containers and supports for the axles or shafts between the differential and the rear wheels. It is understood that the vehicle frame is supported upon these extending tubular members by the two rear main springs, omitted from the drawing for the sake of clarity.

The ball 26 does not necessarily have to be fastened to the housing 24, as it may be fastened to any member rigidly connected between the rear wheels, provided, however, that the ball 26 can be located approximately midway between the wheels. The arm 16 of the bell crank 30 can be operatively connected to the housing 24 or other rigid member between the wheels by any suitable linkage, such as a system of levers. This might be desirable in order to alter the ratio of motions or forces, or to permit a more favorable location of the apparatus involved.

A downwardly extending arm 52 of the frame 10 supports a bearing 50 upon which is pivotally mounted a cylinder 42. The cylinder 42 consists of two fluid-filled compartments 40 and 44 separated by a piston 43 moveable in the cylinder. A piston rod 36 connects the piston 43 to a downwardly extending arm 32 of the bell crank 30. The piston rod 36 is rotatably fastened to the arm 32 at the pivot 34. The cylinder 42 is provided with a stuffing box 38, and the piston rod 36 is free to slide therein. The stuffing box 38 prevents the escape of fluid from the compartment 40 and also acts as a support for the right hand end of the cylinder 42. A pipe 60 permits the flow of fluid into and out of compartment 40 as will be described below. A vent 48 is provided in the compartment 44 to allow the escape of fluid which would otherwise be trapped in the compartment 44 and which would oppose the motion of the piston 43.

The apparatus described in the foregoing paragraph is a pressure fluid motor power element substantially as described and claimed in our co-pending above-mentioned application. The apparatus which forms the subject matter of the present application includes the automatic controlling valves for controlling the flow of operating fluid between the fluid-motor and a source of fluid under pressure. The primary controlling valve is embodied in the cylinder 64, which is supported by the frame 10. A piston 56, having a shape substantially as shown in the drawing, is moveable in the cylinder 64. The ends of the cylinder 64 are closed by fluid-tight cylinder heads 72 and 106, thereby forming fluid compartments 66 and 102 on opposite sides of the piston 56. The amount of travel of the piston 56 is limited by two internal cylinders 70 and 100, which act as stops for the piston. The piston 56 is centered in the cylinder 64 by two springs 74 and 104, which normally bear with equal pressures upon the opposite ends of the piston 56.

A secondary controlling valve is embodied in the cylinder 86, which is also supported by the frame 10. The cylinder 86 may be integral with the cylinder 64. A piston 90, having a shape substantially as shown in the drawing, is moveable in the cylinder 86. The left end of the cylinder is closed by a cylinder head 94. A piston rod 82 is securely fastened to the piston 90 and carries at its extremity a roller 80 which engages a cam 78. The cam 78 may be integral with the bell crank 30. A compression spring 96 between the cylinder head 94 and the piston 90 exerts a force which maintains the roller 80 in constant engagement with the cam 78. The shape of the cam 78 is such that the piston 90 is caused to move toward the left when the bell crank 30 rotates in a clockwise direction. When the bell crank rotates in a counter-clockwise direction, the piston 90 moves toward the right under the influence of the spring 96. Vents 84 and 92 are provided to prevent excessive compression and rarefaction of the fluid in the cylinder 86 upon movement of the piston 90.

The cylinder 86 is provided with a passage 88 which is connected to a source of fluid pressure not shown on the drawing. Passages 76 and 98 provide paths for the flow of fluid between the cylinder 86 and the fluid compartments 66 and 102, respectively. Passages 76 and 98 or passage 88 are constricted to limit the rate of flow of fluid. The dimensions and arrangement of parts are such that when the piston 90 is centered in the cylinder 86, passages 76 and 98 are closed by the piston 90. When the piston moves a short distance toward the right, passage 76 is opened and fluid is allowed to flow from the pressure source through passages 88 and 76 into compartment 66. Similarly, when the piston 90 moves a short distance toward the left, the passage 98 is opened and fluid is allowed to flow from the pressure source through passages 88 and 98 into the compartment 102. Fluid compartments 66 and 102 are provided with constricted passages 68 and 54, respectively, to allow the fluid to escape to the free atmosphere at a rate depending upon the pressure.

The cylinder 64 is provided with three additional passages 62, 60, and 58. The passage 58 is connected to a source of fluid pressure. Fluid compartment 40 is connected to the middle of cylinder 64 by the pipe 60. The passage 62 is open to the free atmosphere. The dimensions and arrangement of parts are such that when the piston 56 is centered in the cylinder 64, passages 58 and 62 are closed by the piston 56. When the piston moves a short distance toward the right, passage 62 is opened and fluid is allowed to escape to the atmosphere from fluid compartment 40 of the cylinder 42 through pipe 60 and passage 62. Similarly, when the piston 56 moves a short distance toward the left, passage 58 is opened and fluid is allowed to flow from the fluid pressure source through passage 58 and pipe 60 into fluid compartment 40. Piston 56 and the passages 58, 60, and 62 comprise, in effect, a three-way valve.

The mounting and arrangement of parts is such that when the vehicle is either standing still or running over a smooth road, the piston 43 and the bell crank 30 assume approximately the positions in which they are shown in Fig. 1, which may be considered their normal positions. Under these conditions, the piston 90 is centered in the cylinder 86 and the passages 76 and 98 are closed. The piston 56 is centered in the cylinder 64 and the passages 62 and 58 are closed. If the vehicle is now assumed to run over irregularities in the road surface, which cause the differential housing 24 to move up and down with respect to the frame 10, it will be seen that the motion of the housing 24 is transmitted to the piston 43 by the bell crank 30 and the piston rod 36. Road irregularities therefore cause the piston 43 to move back and forth in the cylinder 42, and this movement alternately causes compression and rarefaction of the fluid confined in the compartment 40. In order to prevent this alternate compression and rarefaction of the fluid in compartment 40 from adding materially to the stiffness of the vehicle spring suspension, the cylinder 42 is purposely made long relative to the stroke of the piston.

The up and down movement of the housing 24 causes rotation of the bell crank 30 about its pivot 14. Due to the shape of the cam 78, the motion of the bell crank 30 causes the piston 90 to move back and forth in the cylinder 86 in accordance with the up and down motion of the housing 24.

The shape of the cam 78 is such that after the cam has rotated sufficiently in either direction to cause the piston 90 to open either of the passages 76 and 98, further rotation of the cam will not cause further movement of the piston.

When the housing 24 moves up toward the frame 10, the bell crank 30 rotates in a counterclockwise direction, and the piston 90 moves toward the right. The passage 76 is opened by the movement of the piston 90, and fluid flows from the fluid pressure source through passages 88 and 76 into the compartment 66 of cylinder 86. The pressure built up in compartment 66 depends upon the amount and duration of the opening of passage 76. The fluid escapes through the fixed constricted passage 68 at a rate dependent upon the accumulated pressure in compartment 66. Similarly, when the housing 24 moves down away from the frame 10, the bell crank 30 rotates in a clockwise direction, and the piston 90 moves toward the left. The passage 98 is opened by the movement of the piston 90, and fluid flows from the fluid pressure source through passages 88 and 98 into the compartment 102 of the cylinder 64. The pressure built up in compartment 102 depends upon the amount and duration of the opening of passage 98. Similarly, this fluid escapes through the fixed constricted passage 54.

If the load in the vehicle remains constant, the average separation of the frame 10 and the housing 24 will remain constant. As the vehicle runs over irregularities in the road, the piston 90 will move back and forth about an average position, which for this particular case is the center of the cylinder 86, making excursions to the right approximately equal in amplitude and duration to the excursions to the left. The amount of fluid allowed to flow into the compartment 66 is therefore approximately equal to the amount of fluid allowed to flow into compartment 102. Since the rates of escape of fluid through the fixed constricted passages 54 and 68 are approximately equal, the pressure built up in compartment 66 is approximately equal to the pressure built up in compartment 102. The piston 56 therefore remains substantially centered in the cylinder 64 as long as the average separation of the frame 10 and the housing 24 remains constant.

Assume now that the load in the vehicle is increased. The average separation of the frame 10 and the housing 24 will decrease and the average position of the piston 43 will shift toward the right due to the increased compression of the main springs. The piston 90 will therefore move further toward the right than it moves toward the left, and the passage 76 will be open for longer intervals than the passage 98. A greater amount of fluid will flow into compartment 66 than into compartment 102, and the fluid pressure in compartment 66 builds up gradually to a higher value than the fluid pressure in compartment 102. The piston 56 will therefore move toward the left an amount proportional to the difference in pressure in compartments 66 and 102 against the force of the centering spring 104.

The movement of piston 56 toward the left opens passage 58 and allows fluid under pressure to flow from the fluid pressure source through passage 58 and pipe 60 into the fluid compartment 40. The average pressure in compartment 40 in therefore increased, and the average position of the piston 43 is shifted toward the left. The movement of the piston 43 toward the left causes a clockwise rotation of the bell crank 30, which increases the average separation of the frame 10 and the housing 24. This increase of the average separation of the frame 10 and the housing 24 compensates for the decrease due to the added load, the average height of the frame 10 above the road surface therefore approaches the so-called normal position.

When the average separation of the frame 10 and the housing 24 becomes approximately normal, the piston 90 will again move back and forth about a position which is approximately the center of the cylinder 86. The flow of fluid into the two compartments 66 and 102 is again the same. The excess fluid accumulated in compartment 66 gradually escapes through the passage 68, and as the pressures in compartments 66 and 102 again become equal, the piston 56 moves toward the right to the center position, thus closing the passage 58 and cutting off the flow of fluid into the compartment 40. Due to the lag in response of piston 56 to change in the average separation of the frame 10 and the housing 24, the piston will continue to move a small additional distance to the right after the passage 58 is closed. In order to prevent over-compensation for changes in vehicle load, commonly called hunting, it is desirable that passages 58 and 62 be located so that the small additional movement of the piston toward the right will not uncover the passage 62.

The net result, therefore, of an increase in load in the vehicle is that the fluid pressure in compartment 40 is increased sufficiently to support the increased load, thereby maintaining an average constant height of the vehicle frame above the road surface. Similarly, the net result of a decrease in the load in the vehicle is that the fluid pressure in compartment 40 is decreased sufficiently to compensate for the decrease in load, thereby maintaining an average constant height of the vehicle frame above the road surface. Therefore, the two controlling valves embodied in the cylinders 64 and 86 are automatic controlling means for the pressure fluid motor embodied in the cylinder 42 and the piston 43, and the average force exerted by the pressure fluid motor in aiding the suspension system to support the load, is proportional to the load carried by the vehicle. Furthermore, it is apparent that since the average pressure in compartment 40 varies according to the load carried by the vehicle, the compartment 40, or a reservoir connected to compartment 40, is a source of fluid pressure, the pressure of which is proportional to the load.

Particular reference is now made to Fig. 2, which shows another embodiment of our invention applied to a modified form of body-leveling power element. The numeral 110 designates a portion of the vehicle frame as seen from the side. One end of one of the main springs 166 of the vehicle spring suspension is pivotally fastened to the frame 110 at the bearing 168. The other end of the spring is securely fastened to the wheel axle 142 by means of the clamp 144. The power element consists of the cylinder 112 having a piston 114 reciprocable therein. The cylinder 112 is pivotally mounted on the portion 118 of the frame 110 at bearing 120. The piston 114 is connected to substantially the middle of the spring 166 at the bearing 164 by the piston rod 162.

The primary controlling valve is embodied in the cylinder 151, which may be integral with the cylinder 112. The general construction of the valve is the same as that of the primary controlling valve shown in Fig. 1. The passage 134 is connected to a source of fluid under pressure and the passage 152 is open to the free atmosphere. The variable volume compartments 124 and 156 are provided with constricted passages 126 and 160, respectively, open to the free atmosphere.

The secondary controlling valve is a simple three-way valve consisting of an outer cylinder 137 fastened to the frame 110 and an inner valve member 146 having a cut-away portion. The ports 136 and 148 are connected, respectively, to the passages 130 and 154 in the cylinder 151. The passage 150 is connected to a source of fluid under pressure. Rotation of the inner member 146 therefore allows a flow of fluid from the source to either of the variable volume compartments 124 and 156. The inner valve member is rotated by a gear sector 138 securely fastened thereto. The gear teeth on the sector 138 are normally in mesh with teeth on the rack 140 securely fastened to the axle 142 by the clamp 144. The number of teeth on the rack 140 is limited. The arrangement of parts is such that the vertical motion of the axle 142 with respect to the frame 110 causes the rack 140 to rotate the inner valve member 146 sufficiently in either direction to uncover the ports 136 and 148. Further motion of the rack in either direction will not cause further rotation of the valve member 146 because of the limited number of teeth on the rack and gear sector.

The operation of the embodiment shown in Fig. 2 is similar to that of the embodiment shown in Fig. 1. The mounting and arrangement of parts are such that when the vehicle is carrying a mean load and is either standing still or running over a smooth road, the movable parts of the power element, primary controlling valve, and secondary controlling valve assume approximately the positions in which they are shown in the drawing. If the vehicle is now assumed to run over irregularities in the road surface, it will be seen that the motion of the axle 142 causes rotation of the inner valve member 146. When the axle moves up toward the frame, the inner valve member 146 rotates in a counter-clockwise direction and opens the port 148, allowing fluid to flow from the source of fluid pressure through passage 150, port 148, and passage 154 into compartment 156. The pressure built up in compartment 156 depends upon the amount and duration of the opening of the passage 154. The fluid escapes through the fixed constricted passage 160 at a rate dependent upon the accumulated pressure in compartment 156. Similarly, when the axle 142 moves down away from the frame 110, the inner valve member 146 rotates in a clockwise direction and opens the port 136, allowing fluid to flow from the source of fluid pressure through passage 150, port 136, and passage 130 into compartment 124. The pressure built up in compartment 124 depends upon the amount and duration of the opening of passage 136. Similarly, the fluid escapes through the fixed constricted passage 126.

If the load in the vehicle remains constant, the average separation of the frame 110 and the axle 142 will remain constant. As the vehicle runs over irregularities in the road, the inner valve member 146 will rotate back and forth about an average position, making excursions in one direction equal in amplitude and duration to the excursions in the other direction. The amount of fluid allowed to flow into compartment 124 is therefore approximately equal to the amount of fluid allowed to flow into compartment 156, and the pressures built up in the two compartments are approximately equal.

Assume now that the load in the vehicle is increased. The average separation of the frame 110 and the axle 142 will decrease and the average position of the inner valve member 146 will shift in a counter-clockwise direction. A greater amount of fluid will flow into compartment 156 than into compartment 124, and the pressure in compartment 156 will gradually build up to a higher value than the pressure in compart 124. The piston 132 will therefore move up an amount proportional to the difference in pressure in the two compartments against the force of the centering spring.

The upward movement of the piston 132 opens passage 134 and allows fluid from the pressure source to flow through passage 134 and passage 122 into the compartment 116. The average pressure in compartment 116 is increased, and the piston 114 moves downward. This increases the average separation of the frame 110 and axle 142 and compensates for the decrease due to the added load, and the average height of the frame 110 above the road surface therefore approaches the mean position.

When the average separation of the frame and the axle become approximately the mean value, the inner valve member 146 will again move back and forth about the normal position. The flow of fluid into the two compartments 124 and 156 is again the same. The excess fluid accumulated in compartment 156 gradually escapes through the passage 160, and the piston 132 moves down toward the normal position, thus closing the passage 160 and cutting off the flow of fluid into the compartment 116. The net result, therefore, of an increase in load in the vehicle is that the fluid pressure in compartment 116 is increased sufficiently to displace the piston 114 an amount necessary to raise the frame 110 to the mean position. Similarly, the net result of a decrease in load in the vehicle is that the fluid pressure in compartment 116 is decreased sufficiently to displace the piston 114 an amount necessary to lower the frame to the mean position. Therefore, the two controlling valves are automatic controlling means for the power element embodied in the cylinder 112 and piston 114, and the displacement of the power element is proportional to the load carried by the vehicle if the spring 166 has a linear relation of force and deflection.

In the embodiments shown in Figs. 1 and 2, the controlled power elements are pressure fluid motors, and the automatic controlling means are adapted to control the flow of fluid between the motors and the fluid pressure sources. Our present invention is applicable also to power elements other than fluid pressure motors. Such a modified form of our invention is depicted in Fig. 3, to which particular reference is now made.

The primary and secondary controlling valves are shown controlling a double clutch that determines the direction of driving torque applied to a power element. The bevel gear 184 is securely mounted on the driving shaft 180, and meshes with two bevel gears 188 and 230 rotatably mounted on the shaft 190. The gears 188 and 230 carry clutch face members 186 and 228, respectively, fastened thereto. The co-operating clutch member 182 is arranged to slide along a shaft 190, but is made to turn therewith by a spline or other suitable means. If the clutch member 182 is engaged with the face member 188, the shaft 180 drives the shaft 190 in a direction of rotation to decrease the force exerted by or the displacement of the controlled power element, omitted from Fig. 3 for the sake of clarity. Similarly, if the clutch member 188 is engaged with the face member 228, the shaft 180 drives the shaft 190 in a direction of rotation to increase the force exerted by or the displacement of the controlled power element.

The primary and secondary controlling valves are similar to the corresponding valves shown in Fig. 1 and described above. In this embodiment, however, the piston 216 is provided with a piston rod 200 extending beyond the variable volume compartment 222. To this piston rod is connected a cam 199 having a shape substantially as shown in Fig. 3. A cam follower 198 is mounted in the end of the lever 194, which controls the engagement or disengagement of the clutch. The arrangement of cam and follower is such that the clutch is engaged and disengaged with a snap action upon movement of the piston 216 up or down within the cylinder 218. The piston 204 of the secondary controlling valve is provided with a piston rod 208. The motion of the piston 204 is controlled by an oscillatory controlling member in a manner similar to those depicted in Figs. 1 and 2.

A form of power element that might be controlled by the embodiment shown in Fig. 3 was described and claimed in our co-pending application referred to at the beginning of this specification. In this case, an auxiliary spring was used to aid in supporting the vehicle load and a screw was used to adjust the force exerted by the auxiliary spring.

It will be apparent that the automatic controlling means depicted in Fig. 3 might be used to control many other forms of mechanisms. For instance, the cam 199 could be replaced by an electric switch for controlling electrical circuits. It is further apparent that the piston rod 208 may be connected to any form of oscillatory controlling member.

A pointer 197 and scale 201 are provided to indicate the mean position of the oscillatory controlling member.

It should be noted that the power element shown in Fig. 1 might be considered operatively connected in parallel with the main springs of the vehicle, whereas the power element shown in Fig. 2 might be considered operatively connected in series with the main springs. In the former construction, the average force exerted by the power element is proportional to the load carried by the vehicle, whereas in the latter construction, the displacement of the power element is proportional to the load.

In the description of the embodiments of our invention shown in Figs. 1 and 2, various sources of fluid under pressure were mentioned. It should be noted that these sources could be either the same source or different sources of pressure. Furthermore, either one or the other or both sources might be lower than atmospheric pressure, in which case the direction of fluid flow would be the reverse of that cited in the description. In the claims, it will be considered that the free atmosphere is a source of fluid under pressure.

The centering springs in the primary controlling valves of embodiments shown in Figs. 1 and 2 are not essential to the proper operation of the system. Their chief function is to prevent random motions of the piston, which might occur due to the forces of acceleration, deceleration, and gravity acting on the piston.

The invention may be embodied in other specific forms without departing from the spirit or essential characteristics thereof. The present embodiments are therefore to be considered in all respects as illustrative and not restrictive, as various other forms will be apparent to those skilled in the art without departure from the spirit of the invention or the scope of the claims.

What we claim and desire to obtain by United States Letters Patent is:—

1. The method of driving a control-actuating means substantially in accordance with the average position of an oscillatory member, which comprises establishing a restricted path for flow of fluid between a first source of fluid under pressure and one of a pair of variable volume compartments in response to said oscillatory member being above a certain position, establishing a second restricted path for flow of fluid between said first source of fluid and the other of said pair of variable volume compartments in response to said oscillatory member being below another certain position, allowing a substantially continuous restricted flow of fluid between each of said compartments and a second source of fluid under a different pressure, and utilizing the difference in pressures in said two compartments to drive said control-actuating means.

2. The method of controlling fluid flow between a so-called pressure fluid motor and two sources of fluid under different pressures in accordance with an average position of an oscillatory controlling member, which comprises establishing a flow of fluid between a first source of fluid under pressure and one or the other of two variable volume compartments in response to a change in the position of said oscillatory controlling member, allowing substantially continuous restricted flow of fluid between said two compartments and a second source of fluid under a different pressure, and utilizing the difference in pressures in said two compartments to control the flow of fluid between said pressure fluid motor and said two sources of fluid under pressure.

3. The method of controlling the force exerted by a power element in accordance with an average position of an oscillatory controlling member, which comprises establishing a flow of fluid between a first source of fluid under pressure and one or the other of two variable volume compartments in response to a change in the position of said oscillatory controlling member, allowing a substantially continuous restricted flow of fluid between said two compartments and a second source of fluid under a different pressure, and utilizing the difference in pressures in said two compartments to control the force exerted by said power element.

4. In a vehicle suspension system including a set of elastic members adapted to support the vehicle upon its wheel axles, the method of operating a pressure fluid motor effectively connected between the vehicle body and the wheel axles in an aiding relation to said elastic members, which comprises providing a plurality of sources of fluid under pressure, establishing a controllable path between one of said sources and said pressure fluid motor, establishing a second controllable path between another of said sources and said pressure fluid motor, and causing one of said paths to become exclusively effective in accordance with the average separation of said vehicle body and said wheel axles over an extended period of time while preventing instantaneous changes in the separation from effecting the flow of fluid in either of said paths.

5. In a vehicle suspension system including a set of elastic members adapted to support the vehicle body upon its wheel axles, the combination of a pressure fluid motor adapted to aid in supporting said body upon its wheel axles by exerting force in response to fluid pressure inside the cylinder of said motor, two sources of fluid under different pressures, a three way valve of the cylinder and piston type adapted to connect said cylinder to one of said sources of fluid for a first position of said valve, to connect said cylinder to the other of said sources for a second position of said valve, and to stop connections to both said sources for a third position of said valve, said third position being intermediate said first and second positions, valve-actuating means for controlling said valve to vary the average fluid pressure inside said cylinder of said pressure fluid motor in accordance with the variable load in said vehicle, said valve-actuating means including the variable volume compartments on each side of the piston of said valve, said piston being acted upon by fluid pressure in said variable volume compartments.

6. The invention set forth in claim 5 additionally characterized in that said pressure fluid motor is pivotally connected to said vehicle body and is operatively connected to said wheel axles by linkage which includes a bell crank.

7. In a vehicle suspension system including a set of elastic members to support the vehicle body upon its wheel axles, the combination of a power element adapted to exert force tending to alter the average separation of said body and said wheel axles, said power element including a variable volume compartment and being adapted to exert force in response to fluid pressure inside said compartment, a plurality of sources of fluid under different pressures, variable means for alternatively connecting said compartment to one of said sources, connecting said compartment to a source of fluid under lower pressure, or substantially stopping all connections to said compartment, a pair of variable volume compartments operatively connected such that one decreases in volume as the other increases and increases in volume as the other decreases, said pair of variable volume compartments controlling by their action said variable means, a second variable means operative to connect one of said sources of fluid to one of said pair of variable volume compartments when said vehicle body is more than a certain distance above said wheel axles and operative to connect last named source to the other of said pair of variable volume compartments when said vehicle body is less than another certain distance above said wheel axles, other connecting means between said pair of variable volume compartments and another than the last named said source of fluid under pressure, permitting restricted flow.

8. In combination, a pressure fluid motor, a plurality of sources of fluid under different pressures, an oscillatory controlling member, a three way valve for controlling the flow of fluid between said pressure fluid motor and two of said sources of fluid under pressure, two variable volume compartments, means for establishing a flow of fluid between one of said sources of fluid under pressure and one or the other of said two variable volume compartments in response to a change in the position of said oscillatory controlling member, means for allowing a substantially continuous restricted flow of fluid between said two compartments and another of said sources of fluid under pressure, and means for utilizing the difference in pressures in said variable volume compartments to actuate said three way valve.

9. In a device for indicating the mean position of an oscillatory element, the combination of a pair of sources of fluid under different pressures, two variable volume compartments, an indicating member responsive to the difference in pressures in said two compartments, elastic means restricting said member, valve and conducting means operative to connect one of said sources of fluid to one of said compartments when said oscillatory element is above a given position and operative to connect the same source of fluid to the other of said compartments when said oscillatory element is below another given position, and restricted connections between each of said compartments and other of said sources of fluid under pressure.

10. In a vehicle suspension system including a set of elastic members to support the vehicle body upon its wheel axles, the combination of a power element adapted to exert force tending to change the average separation of said body and said wheel axles, a source of motive power adapted to alter the effectiveness of said power element in changing said separation, a controlling means for controlling said source of motive power, a pressure fluid motor for actuating said controlling means, a plurality of sources of fluid under different pressures, an oscillatory controlling member operatively connected to said wheel axles, a three way valve for controlling the flow of fluid between said pressure fluid motor and two of said sources of fluid under pressure, two variable volume compartments, means for establishing flow of fluid between one of said sources of fluid under pressure and one or the other of said two variable volume compartments in response to a change in the position of said oscillatory controlling member, means for allowing a substantially continuous restricted flow of fluid between said two compartments and another of said sources of fluid under pressure, and means for utilizing the difference in pressures in said variable volume compartments to actuate said three way valve.

11. In a vehicle suspension system including a set of elastic members to support the vehicle body upon its wheel axles, the combination of a power element adapted to exert force tending to change the average separation of said body and said wheel axles, a source of motive power adapted to alter the effectiveness of said power element in changing said separation, a controlling means for controlling said source of motive power, an oscillatory controlling member operatively connected to said wheel axles, a plurality of sources of fluid under different pressures, two variable volume compartments, means for establishing a flow of fluid between one of said sources of fluid under pressure and one or the other of said two variable volume compartments in response to a change in the position of said oscillatory controlling member, means for allowing a substantially continuous restricted flow of fluid between said two compartments and another of said sources of fluid under pressure, and means for utilizing the difference in pressures in said variable volume compartments to actuate said controlling means.

12. In a vehicle suspension including an elastic supporting system, the combination of a power operated device adjustable to alter the effective average working position of part of said supporting system in accordance with the load on said vehicle, said device being controlled by a reversible clutch mechanism, means effective to cause engagement of said reversible clutch mechanism in either sense in response to difference in fluid pressures in two variable volume compartments, two sources of fluid under different pressures, an oscillatory controlling member responsive to the instantaneous working position of said part of said supporting system, valve means operative to connect one of said sources of fluid to one of said compartments when said oscillatory controlling member is above a given position and operative to connect the same source of fluid to the other of said compartments when said oscillatory controlling member is below another given position, and restricted connections between each of said compartments and other of said sources of fluid under pressure.

13. In a vehicle suspension system, a power element adapted to assume a portion of the vehicular weight, a source of fluid under pressure, a three way valve for admitting fluid to said power element, for permitting fluid to escape from said power element, and for stopping the flow of fluid to said power element, and a second three way valve, responsive to the position of the vehicle body with respect to its running gear, for controlling the position of the first named three way valve.

14. In combination, a vehicle body, running gear therefor, springs interposed between said running gear and said body, a power element effectively connected between said running gear and said body in aiding relation to said springs, automatically functioning means for energizing said power element to raise said body to a predetermined position when said body is depressed with respect to said running gear in response to increased load on said body, and automatically functioning means for de-energizing said power element to lower said body to a predetermined position when the load on said body is decreased.

15. The invention set forth in claim 14 additionally characterized in that automatically functioning means are provided whereby said power element is prevented from being energized or de-energized in response to instantaneous changes in the spacing between said running gear and said body occasioned by irregularities in the surface over which the vehicle passes.

ALDA V. BEDFORD.
DANIEL C. HOFFMANN.